3,110,721
PREPARATION OF ORGANO-HALOGENO-SILANES

Harold Garton Emblem, Grappenhall, and Richard Charles le Fleming, Huyton, near Liverpool, England, assignors to Philadelphia Quartz Company, Philadelphia, Pa., a corporation of Pennsylvania
No Drawing. Filed May 26, 1961, Ser. No. 112,786
Claims priority, application Great Britain June 24, 1960
11 Claims. (Cl. 260—448.2)

This invention relates to processes for the preparation of organo-halogeno-silanes, and is more particularly concerned with processes for preparing such compounds by reacting at an elevated temperature a compound of the formula RX, where R is an alkyl radical and X is a halogen atom, with silicon.

The present invention provides a process for the preparation of an alkyl halogeno-silane which comprises reacting at an elevated temperature an alkyl halide with silicon in the presence of a catalyst obtained by reducing cobaltous chloride or bromide by heating it in hydrogen.

An alkyl halogeno-silane may thus be prepared, for example, by heating an intimate mixture of finely-divided silicon or silicon alloy and cobaltous chloride or bromide in hydrogen to reduce the halide and thereafter passing an alkyl halide over the resulting silicon-containing catalysed contact mass, heated to a suitable temperature, to effect reaction between the silicon and alkyl halide with the production of an alkyl halogeno-silane.

The silicon is advantageously present in the form of an alloy such as a ferrosilicon alloy; such an alloy may contain from 10% to 50% of iron, preferably from 10% to 20% of iron. A typical ferrosilicon alloy suitable for use in the process of the invention is one containing about 12% of iron, the balance being silicon and small amounts of impurities such as carbon, aluminum, calcium and other metals which are normally present in commercial ferrosilicon alloys.

Satisfactory results have been obtained with the use of an amount of cobaltous chloride or bromide having a cobalt content of about 20% by weight based on the amount of silicon employed in the reaction. However, other amounts varying between 15% and 25%, for example, calculated on the same basis, may also be employed. If the cobalt halide employed contains water of crystallisation this must be removed prior to or during the reduction stage.

The temperature at which the cobaltous chloride or bromide is heated in hydrogen to be reduced to an active catalytic form will generally be above 300° C. If the halide is reduced when in admixture with the silicon or silicon-containing material, the temperature must not be too high since at about 450° C. to 500° C. an exothermic and uncontrollable reaction may occur between the cobalt halide and the silicon. Moist hydrogen may be used for the reduction which then occurs more readily.

It has been observed, surprisingly, that if the cobaltous chloride or bromide is replaced by a cobalt oxide such as $Co_3O_4$ the cobalt metal obtained by the reduction of the oxide with hydrogen is very markedly inferior as a catalyst to the material obtained by reducing cobaltous chloride or bromide in accordance with the invention.

The optimum temperature for carrying out the reaction between the alkyl halide and the silicon (in the presence of the reduced cobaltous chloride or bromide catalyst) depends on a number of factors including the form in which the silicon is present and the degree of fineness of the silicon or silicon alloy, but suitable reaction temperatures can be determined by simple trial for any particular case. In general, for a given reaction temperature, the yield of alkyl halogeno-silanes is greater when ferrosilicon is used than when silicon is used. It has been found with ferrosilicon, for example, that for any given reaction temperature the best results tend to be obtained when at least the major proportion of the particles of the alloy are within the range 76 to 104 microns (that is to say of such particle size that they pass a 150 mesh British Standard sieve but are retained on a 200 mesh sieve). An increase or a decrease in the particle size outside this range tends to produce lower yields of alkyl halogeno-silanes. Satisfactory results have been obtained in the temperature range 300 to 400° C., more especially at about 350° C. Furthermore, as a general rule it has been found that the more finely-divided the silicon material the higher must be the reaction temperature to obtain optimum yields of alkyl halogeno-silanes. For example, ferrosilicon alloy of particle size less than 53 microns (that is to say of such particle size that it passes a 300 mesh sieve) gives better yields at 400° C. than at 350° C.

The reaction may be performed in a silica or mullite tube placed horizontally in a furnace and the reaction products may be condensed and collected in a liquid nitrogen trap and subsequently fractionated, if desired, to separate the alkyl halogeno-silanes from the other products. The preferred alkyl halides are methyl and ethyl halides, more especially the chlorides, but other halides such as the propyl and butyl halides, may be reacted with silicon to prepare the corresponding alkyl halogeno-silanes. Unsaturated alkyl halides such as vinylchloride may also be used.

The products obtained by the process of the invention may include an alkyl halogeno-silane containing a hydrogen atom linked to the silicon atom.

The following examples illustrate the invention. Example 1 describes the preparation of a contact mass for reaction with an alkyl halide, Examples 2 to 6 describe processes in accordance with the invention of preparing alkyl halogeno-silanes, and Example 7, which is given for comparison purposes, illustrates the results obtained when the cobalt halide is omitted or replaced by a cobalt oxide.

Example 1

Finely-divided ferrosilicon alloy containing 88% silicon (the balance being iron, with up to 1% of impurities) was intimately mixed with powdered anhydrous cobaltous chloride in an amount corresponding to a cobalt content of about 20% by weight based on the silicon content of the ferrosilicon alloy. The mixture was placed in a silica or mullite tube, which was arranged horizontally in a furnace, heated to 400° C. and hydrogen passed over for 5 hours at a flow rate of 10 litres per hour.

Example 2

A contact mass was prepared as described in Example 1 employing 70 g. of silicon (98%) having a particle size of 76 to 104 microns.

Immediately after the contact mass had been prepared, it was maintained at 350° C. and 34.4 litres of methyl chloride vapour passed over at the rate of 4.6 litres per hour. The reaction products were condensed and collected in a liquid nitrogen trap, the condensed liquid having a volume of about 100 ml. of which about 19 ml. had a boiling range of 48 to 64° C. and consisted mainly of trimethylchlorosilane.

Example 3

A contact mass was prepared as described in Example 1 employing 72 g. of the ferrosilicon alloy which had a particle size of 76 to 104 microns.

Immediately after the contact mass had been prepared, it was maintained at 350° C. and 122 litres of methyl chloride vapour passed over at the rate of 4.6 litres per hour. The reaction products were condensed and collected in a liquid nitrogen trap. The condensed liquid had a volume of about 395 ml. of which 122 ml. had a boiling range of 55° C. to 67° C. and consisted mainly of trimethylchlorosilane.

*Example 4*

A contact mass was prepared as described in Example 1, the ferrosilicon alloy having a particle size of 76 to 104 microns.

Immediately after the contact mass had been prepared, it was maintained at 350° C. and ethyl chloride vapour passed over at the rate of 4.6 litres per hour for 20¼ hours. The reaction products were condensed and collected in a liquid nitrogen trap; the condensed liquid had a volume of 139 ml. The liquid was fractionated, at atmospheric pressure, and fractions having boiling ranges of 40° to 55° C., 55° to 80° C. and 90° to 110° C. had volumes of 50 ml., 50 ml., and 30 ml., respectively, and silicon contents of 12.3%, 12.85% and 17.05%, respectively; all the fractions contained chlorine. The 30 ml. fraction consisted of ethyl chlorosilanes. The make of ethyl chlorosilanes was 6.7 ml. per mole of ethyl chloride.

*Example 5*

78.5 g. of ferrosilicon, of particle size 76 to 104 microns, containing 88% silicon (the balance being iron, with up to 1% impurities), were intimately mixed with powdered anhydrous cobaltous chloride in an amount corresponding to a cobalt content of 20% by weight, based on the silicon content of the alloy. The mixture was placed in a silica tube, arranged horizontally in a furnace, heated to 350° C. and hydrogen passed over for 5 hours at a flow rate of 15 litres per hour.

Immediately after the contact mass had been prepared, it was maintained at 350° C. and 29.9 litres of methyl chloride vapour passed over at the rate of 4.6 litres per hour. The reaction products were condensed and collected in a liquid nitrogen trap. The condensed liquid had a volume of 82 ml., of which about 35 ml. (26.2 g.) had a boiling range of 40–65° C., mainly 56–58° C., and consisted of a mixture of methyl chlorosilanes.

*Example 6*

71 g. of ferrosilicon, particle size 76 to 152 microns, being a commercial material with 90–95% silicon content, the balance being iron with up to 1% impurities, were intimately mixed with 29 g. of powdered anhydrous cobaltous chloride. The mixture was heated in hydrogen as described in Example 1.

Immediately after the contact mass had been prepared, it was maintained at 410–420° C. and a mixture of methyl chloride vapour and nitrogen was passed over. The methyl chloride vapour flow-rate was 3.35 litres per hour, the nitrogen flow-rate was 5 litres per hour. The reaction was continued until 79.6 litres of methyl chloride vapour had passed over. The reaction products were condensed and collected in a liquid nitrogen trap. From the products, 45.2 g. were obtained boiling in the range 36–58° C. This fraction contained some methyl dichlorosilane together with the silicon tetrachloride-trimethyl chlorosilane azeotrope.

*Example 7*

80 g. of ferrosilicon, having an iron content of 11.8%, and a particle size of 76–104 microns, and 19.25 g. of finely powdered $Co_3O_4$ were mixed. This amount of oxide corresponds to a cobalt content of 20% by weight based upon the silicon content of the alloy. The mixture was placed in a silica tube arranged horizontally in a furnace, heated to 400° C. and hydrogen passed over for 5 hours at a flow-rate of 10 litres per hour. The loss in weight of the mixture was 5.1 g. the theoretical loss for complete reduction of the oxide being 5.15 g.

The reduced mixture was heated in the silica tube at 350° C., and methyl chloride passed over at a rate of 4.6 litres per hour until 132.3 litres had passed over. The reaction products were condensed and collected in a liquid nitrogen trap, the condensed liquid having a volume of 331 ml., of which 103 ml. had a boiling range of 55–67° C. The make of product having a boiling range of 55–67° C. was 11.27 ml. per mole of methyl chloride.

The experiment was repeated using only the ferrosilicon. The make of product having a boiling range of 55–67° C. was 8.1 ml. per mole of methyl chloride.

For example 3, the corresponding figure is 22.4 ml. per mole of methyl chloride.

What is claimed is:

1. A process for the preparation of an alkyl halogenosilane which comprises reacting at an elevated temperature an alkyl halide with silicon in the presence of a catalyst obtained by reducing a cobaltous halide selected from the class consisting of cobaltous chloride and cobaltous bromide, by heating it in hydrogen.

2. A process for the preparation of an alkyl halogenosilane which comprises heating an intimate mixture of finely-divided silicon material selected from the class consisting of silicon and ferrosilicon alloys and a cobaltous halide selected from the class consisting of cobaltous chloride and cobaltous bromide in hydrogen to reduce the halide and thereafter passing an alkyl halide vapour over the resulting silicon-containing catalysed contact mass, heated to a suitable temperature, to effect reaction between the silicon and alkyl halide with the production of an alkyl halogeno-silane.

3. A process as claimed in claim 1 wherein the silicon is present in the form of a ferrosilicon alloy.

4. A process as claimed in claim 3 wherein the alloy contains 10 to 20% by weight of iron.

5. A process as claimed in claim 3 wherein at least the major proportion of the ferrosilicon alloy has a particle size in the range 76 to 104 microns.

6. A process as claimed in claim 1 wherein the cobaltous halide reduced is cobaltous chloride.

7. A process as claimed in claim 1 wherein the cobaltous halide is reduced at a temperature of at least 300° C.

8. A process as claimed in claim 1 wherein the weight of cobalt present is about 15 to 25% of the weight of the silicon.

9. A process as claimed in claim 1 wherein the alkyl halide is a saturated alkyl halide.

10. A process as claimed in claim 1 wherein the alkyl halide is reacted with the silicon at a temperature of about 300 to 400° C.

11. A process as claimed in claim 1 wherein the alkyl halide is selected from the class consisting of methyl and ethyl chlorides.

References Cited in the file of this patent

UNITED STATES PATENTS

| | | |
|---|---|---|
| 2,666,776 | Nitzsche | Jan. 19, 1954 |
| 2,783,164 | Hill | Feb. 26, 1957 |
| 2,889,348 | Fitch | June 2, 1959 |